(12) United States Patent
Cheng et al.

(10) Patent No.: US 9,842,613 B2
(45) Date of Patent: *Dec. 12, 2017

(54) METHODS OF FORMING PORTIONS OF NEAR FIELD TRANSDUCERS (NFTS) AND ARTICLES FORMED THEREBY

(71) Applicant: SEAGATE TECHNOLOGY LLC., Cupertino, CA (US)

(72) Inventors: Yuhang Cheng, Edina, MN (US); Sami Antrazi, Eden Prairie, MN (US); Michael Seigler, Eden Prairie, MN (US); Scott Franzen, Savage, MN (US); Philip G. Pitcher, Shakopee, MN (US); Edwin F. Redja, Bloomington, MN (US); Kurt W. Wierman, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,939

(22) Filed: Apr. 4, 2016

(65) Prior Publication Data

US 2016/0217812 A1 Jul. 28, 2016

Related U.S. Application Data

(63) Continuation of application No. 14/266,920, filed on May 1, 2014, now Pat. No. 9,305,572.

(51) Int. Cl.
*G11B 5/31* (2006.01)
*B44C 1/22* (2006.01)
*G11B 5/00* (2006.01)

(52) U.S. Cl.
CPC ............ *G11B 5/3133* (2013.01); *G11B 5/313* (2013.01); *G11B 5/314* (2013.01); *G11B 5/3116* (2013.01);
(Continued)

(58) Field of Classification Search
None
See application file for complete search history.

(56) References Cited

U.S. PATENT DOCUMENTS 4,492,873 A 1/1985 Dmitriev
5,482,611 A 1/1996 Helmer
(Continued)

FOREIGN PATENT DOCUMENTS

EP 0240088 10/1987
EP 0942072 9/1999
(Continued)

OTHER PUBLICATIONS

Al-Bayati et al., Junction Profiles of Sub keV Ion Implantation for Deep Sub-Quarter Micron Devices, IEEE, 2000, pp. 87-90.
(Continued)

*Primary Examiner* — Shamim Ahmed
(74) *Attorney, Agent, or Firm* — Mueting, Raasch & Gebhardt, P.A.

(57) ABSTRACT

Methods that include forming at least a portion of a near field transducer (NFT) structure; depositing a material onto at least one surface of the portion of the NFT to form a metal containing layer; and subjecting the metal containing layer to conditions that cause diffusion of at least a portion of the material into the at least one surface of the portion of the NFT; and devices formed thereby.

20 Claims, 7 Drawing Sheets

(52) U.S. Cl.
CPC .... *G11B 5/3163* (2013.01); *G11B 2005/0021* (2013.01)

(56) References Cited

U.S. PATENT DOCUMENTS

| | | |
|---|---|---|
| 5,849,093 A | 12/1998 | Andra |
| 5,945,681 A | 8/1999 | Tokiguchi |
| 6,130,436 A | 10/2000 | Renau |
| 6,589,676 B1 | 7/2003 | Gui |
| 6,632,483 B1 | 10/2003 | Callegari |
| 6,641,932 B1 | 11/2003 | Xu |
| 6,683,426 B1 | 1/2004 | Kleeven |
| 8,945,731 B2 | 2/2015 | Zhao |
| 2008/0230724 A1 | 9/2008 | Low |
| 2010/0190036 A1 | 7/2010 | Komvopoulos |
| 2010/0320403 A1 | 12/2010 | Amaldi |
| 2011/0006214 A1 | 1/2011 | Bonig |
| 2011/0026161 A1 | 2/2011 | Ikeda |
| 2013/0161505 A1 | 6/2013 | Pitcher |
| 2013/0164453 A1 | 6/2013 | Pitcher |
| 2013/0164454 A1 | 6/2013 | Pitcher |
| 2013/0234266 A1 | 9/2013 | Prejbeanu |
| 2013/0244192 A1 | 9/2013 | He |
| 2014/0113160 A1 | 4/2014 | Pitcher |
| 2014/0376352 A1 | 12/2014 | Cheng |
| 2015/0076435 A1* | 3/2015 | Arayashiki .......... H01L 45/145 257/3 |
| 2015/0170683 A1 | 6/2015 | Balamane |

FOREIGN PATENT DOCUMENTS

| | | |
|---|---|---|
| EP | 1328027 | 7/2003 |
| EP | 2106678 | 10/2008 |
| KR | 10-2013-0028684 | 3/2013 |
| KR | 10-2013-0105487 | 9/2013 |
| KR | 10-2014-0002527 | 1/2014 |
| WO | WO 97/45834 | 12/1997 |

OTHER PUBLICATIONS

Angel et al., "Enhanced Low Energy Drift-Mode Beam Currents in a High Current Ion Implanter," IEEE, 1999, pp. 219-222.

Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.

Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.

Piazza et al., "Large Area Deposition of Hydrogenated Amorphous Carbon Films for Optical Storage Disks", Diamond and Related Materials, vol. 13, No. 4-8, Apr. 2004, pp. 1505-1510.

Robertson, J., "Diamond-Like Amorphous Carbon," Materials Science and Engineering R 37, 2002, pp. 129-281.

PCT/US2013/024273 Search Report and Written Opinion dated Apr. 2, 2013.

PCT/US2013/024274 Search Report and Written Opinion dated Apr. 2, 2013.

PCT/US2013/030659 Search Report and Written Opinion dated Jun. 17, 2013.

* cited by examiner

FIG. C

METHODS OF FORMING PORTIONS OF NEAR FIELD TRANSDUCERS (NFTS) AND ARTICLES FORMED THEREBY

RELATED APPLICATION

This application is a continuation of U.S. patent application Ser. No. 14/266,920, now U.S. Pat. No. 9,305,572, entitled METHODS OF FORMING PORTIONS OF NEAR FIELD TRANSDUCERS (NFTS) AND ARTICLES FORMED THEREBY, filed May 1, 2014, the disclosure of which is incorporated herein by reference thereto.

SUMMARY

Disclosed are methods that include forming at least a portion of a near field transducer (NFT) structure; depositing a material onto at least one surface of the portion of the NFT to form a metal containing layer; and subjecting the metal containing layer to conditions that cause diffusion of at least a portion of the material into the at least one surface of the portion of the NFT.

Also disclosed are methods that include forming at least a portion of a near field transducer (NFT) structure; depositing a material onto at least an air bearing surface of the NFT to form a metal containing layer; subjecting the metal containing layer to conditions that cause diffusion of at least a portion of the material into the at least one surface of the portion of the NFT; removing at least a portion of the metal containing layer; and applying an overcoat layer.

Further disclosed are methods that include forming at least a portion of a near field transducer (NFT) structure; depositing a material onto at least an air bearing surface of the NFT to form a metal containing layer; removing a portion of the metal containing layer not on the air bearing surface of the NFT; subjecting the metal containing layer to conditions that cause diffusion of at least a portion of the material into the at least one surface of the portion of the NFT; removing at least a portion of the metal containing layer; and applying an overcoat layer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIG. 7C is a EDX mapping showing the Cr concentration at the portion of FIG. 7A shown by the box.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (HAMR) uses a source of energy, for example a laser, to increase the temperature of media above its curie temperature, to enable magnetic recording at smaller areal densities. To deliver the energy (for example) to a small area (on the order of 20 to 50 nanometers (nm) for example) of the medium, a near field transducer (NFT) can be utilized. During recording processes, the NFT and pole absorb energy from the energy source, causing an increase in the temperature of the NFT (sometimes up to 400° C. for example). Some NFTs include a small peg and a large disk. The high temperatures reached by the NFT and pole can cause oxidation of the pole, corrosion of the pole, diffusion of atoms from the peg to the disk, or combinations thereof, and can thereby cause damage to the pole and deformation and recession of the peg.

Disclosed methods and devices may provide NFTs that suffer less from deformation and recession. Disclosed methods and devices can form and/or include pegs having a material that has diffused into the peg from an external layer. Methods include forming a metal containing layer on at least one surface of the NFT and forcing at least some of that layer to diffuse into the NFT.

Figure 1:
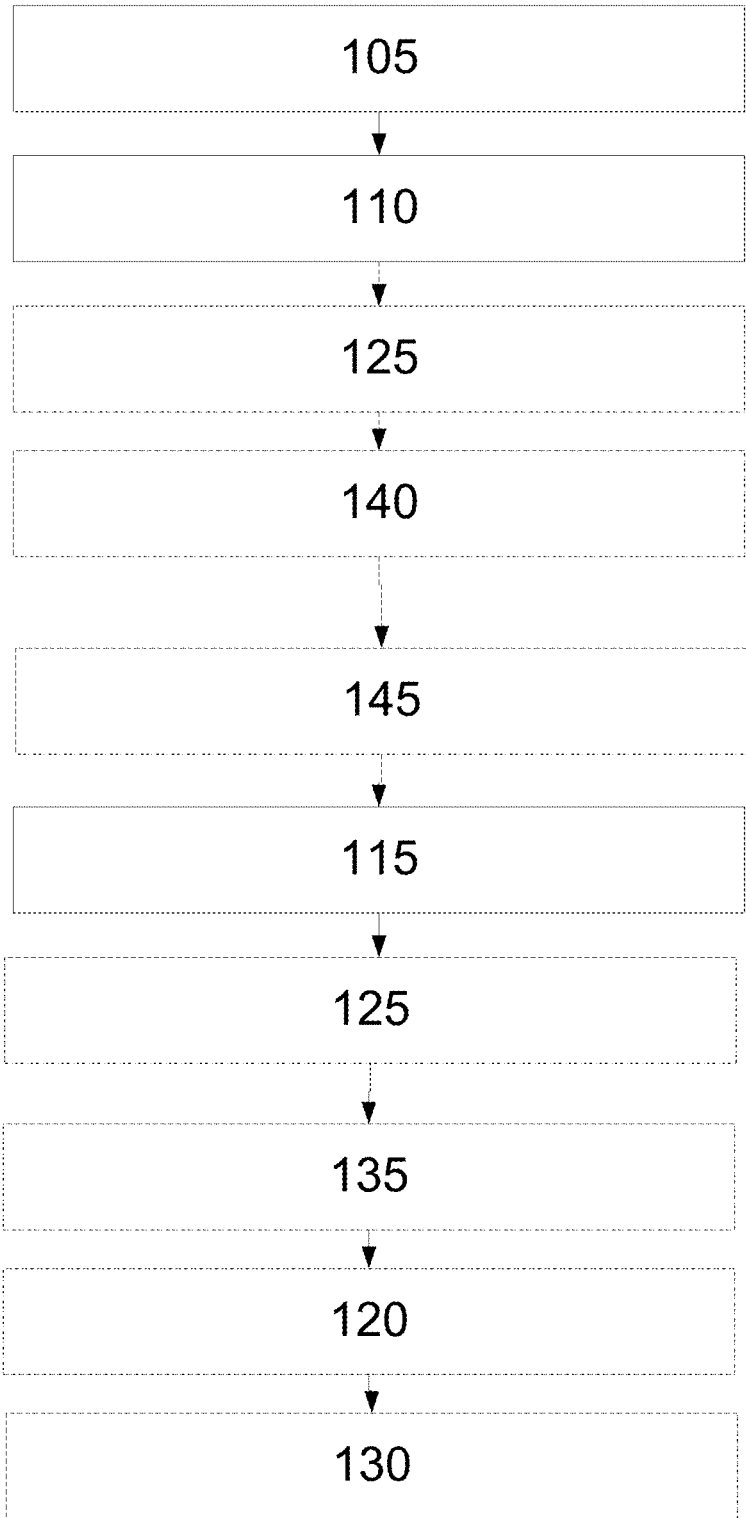
FIG. 1 is a flow chart depicting exemplary embodiments of disclosed methods.

In some embodiments, methods disclosed herein can be represented by the flow chart shown in FIG. 1. As such, in some methods a first step can include step 105, forming at least a portion of a near field transducer (NFT) structure. Step 105 can include one or more than one individual step, for example. The step, 105 of forming at least a portion of a NFT, can include various processes and methods. In some embodiments NFTs that are commonly referred to as "disc and peg" type can be formed herein. In some embodiments, at least a peg of a disc and peg type NFT can be formed as part of some disclosed methods. The peg can be at various stages of manufacture, for example. In some embodiments, the peg can be a peg within a larger device structure that has been exposed to lapping, e.g., lapping to form an air bearing surface (ABS).

The step of forming at least a portion of a NFT can include utilizing one or more than one material to form the portion (or more) of the NFT. In some embodiments, various materials including, for example, gold (Au), silver (Ag), copper (Cu), alloys thereof, or other materials can be utilized to form the at least a portion of the NFT.

Some disclosed methods can include a next step, step 110, of depositing a layer. In some embodiments, the layer can be deposited on at least one surface of at least the portion of the NFT. In some embodiments, the layer deposited in step 110 can be referred to as a metal containing layer. The metal containing layer includes at least one material that can diffuse (either with or without outside influence) into the surface upon which it is deposited. The metal containing layer can be deposited using known methods including for example deposition methods such as chemical vapor deposition (CVD), physical vapor deposition (PVD), atomic layer deposition (ALD), plating (e.g., electroplating), sputtering methods, cathodic arc deposition methods, ion implantation method and evaporative methods.

In some embodiments, the metal containing layer can have any desirable thickness and can even have a variable thickness. In some embodiments, the metal containing layer can have a thickness of not more than 10 nanometers (nm), or not more than 5 nm for example. In some embodiments, the metal containing layer can have a thickness of greater than 0.1 nm, or greater than 0.5 nm for example. It should be noted that a metal containing layer can refer to more than one discrete metal containing layer even if the discrete layers are not in contact with each other.

The metal containing layer can include various materials or a single material. In some embodiments, the material of the metal containing layer can include materials that have relatively good adhesion to the material(s) of the NFT portion of interest, relatively high diffusion coefficient at the interface of the metal containing layer and the portion of the NFT, relatively high oxidation resistance, relatively low diffusion in the bulk of the material of the NFT, or any combination thereof.

The metal containing layer can include a single layer or more than one layer. In some embodiments where the metal containing layer is a single layer, it can include an intermetallic phase or a material that can form an intermetallic phase (which can provide high thermal stability, oxidation resistance, or both). In some embodiments, the metal containing layer can be a multilayer structure that includes at least two layers. In such cases, the multilayer could be used to produce an intermetallic phase. In some embodiments, a multilayer metal containing layer can also include one or more layers whose material may be chosen to provide some processing advantage.

In some embodiments, a metal containing layer can include aluminum (Al), nickel (Ni), chromium (Cr), platinum (Pt), lead (Pb), copper (Cu), yttrium (Y), silicon (Si), indium (In), tin (Sn), cobalt (Co), boron (B), titanium (Ti), tantalum (Ta), niobium (Nb), magnesium (Mg), zirconium (Zr), Radon (Ra), hafnium (Hf), vanadium (V), manganese (Mn), iron (Fe), palladium (Pd), silver (Ag), zinc (Zn), holmium (Ho), erbium (Er), phosphorus (P), or combinations thereof. Exemplary multilayer structures could include Al/Au, Ni/Cr, Ni/Al, Cr/Al, and Ni/Au, for example. In some embodiments, the metal containing layer could include Cr, Pt, Pb, Ni, Si, In, Sn, Al, Co, B, or combinations thereof, for example. In some embodiments, the metal containing layer could include Cr, Sn, Pt, Y, Pd, Mn, Cu, In, Ni or combinations thereof. In some embodiments, the metal containing layer could include Ni/Cr, Al/Au, or Ni/Al, for example.

In some embodiments, a metal containing layer can include two (or more) layers of different (or the same) materials. In some embodiments, a second layer, not in contact with the NFT can be referred to as an outer layer. For example, an outer layer could be chosen based on various ways of removing that material. As a specific example, an outer layer could be chosen such that a particular chemical etching process, for example a reactive plasma etch could be used to remove the outer layer. One particular type of outer layer that could be utilized to provide such characteristics could be an Si containing (e.g., a $SiO_2$ containing) layer, that can be removed using fluorine based chemistries (e.g., $CF_4$, $SF_6$, or $CHF_3$) for example. An even more specific example of a multilayer structure that could be chosen by considering such a property is a multilayer metal containing layer that contains a chromium (Cr) NFT adjacent layer and a $SiO_2$ outer layer. Such a multilayer structure could be processed using a fluorine chemistry which could remove the outer $SiO_2$ layer and stop on the Cr layer. The excess Cr layer could then either be ion milled away or oxidized.

Another example of a multilayer metal containing layer that could be advantageous because of processing characteristics could include an outer layer that could act as a gas barrier layer and an underlying (NFT adjacent) metallic layer. The outer layer functioning as a gas barrier layer could function to prevent the oxidation of the underlying metallic layer during annealing. Particular examples of materials that could function as gas barrier layers could include, for example, a metal layer that is relatively resistant to oxidation (e.g., Pt, Pd), a metal layer that could be oxidized to form an oxide layer (e.g., Cr, Si, Al, Ti, Mn, or Ta), diamond like carbon (DLC), nitrides, carbides, and oxides. Specific oxides could include for example CrO, $SiO_2$ and AlO. Specific nitrides could include SiN, TiN, ZrN, TiAlN, CrN and TiSiN for example.

Another example of a multilayer metal containing layer is one that includes a NFT adjacent layer having desirable properties (relatively good adhesion to the material(s) of the NFT portion of interest, relatively high diffusion coefficient at the interface of the metal containing layer and the portion of the NFT, relatively high oxidation resistance, relatively low diffusion in the bulk of the material of the NFT, or any combination thereof) and an outer layer that can be oxidized to form an oxide having desired properties. Properties that may be relevant for the outer layer can include, for example a material that would be likely to form a dense oxide upon oxidation that is relatively highly corrosion resistant, a material that has a low refractive index (n) upon oxidation, a low optical absorption (k) upon oxidation, or some combination thereof.

In some embodiments, a metal containing layer can be deposited on one or more than one surface of a portion of a NFT. In some embodiments, for example, a metal containing layer can be deposited on one or more than one surface of a peg of a NFT. In some embodiments, for example, a metal containing layer can be deposited on at least the air bearing surface (ABS) of a peg of a NFT. In some embodiments, for example, a metal containing layer (or discrete layers of a metal containing layer) can be deposited on all exposed surfaces of a peg. In some embodiments therefore each exposed surface of the peg could have a metal containing layer thereon. The metal containing layers on the exposed surfaces of the peg need not be physically in contact with each other and can be discrete layers.

Figure 4:
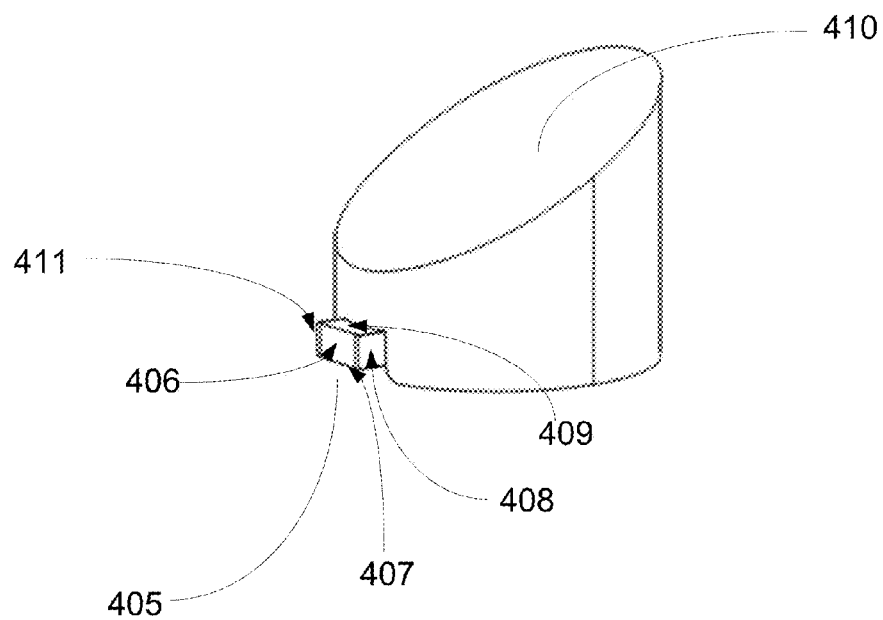
FIG. 4 is a perspective view of an exemplary NFT that includes a peg and a disc.

In some embodiments, for example, a metal containing layer can be deposited on five exposed surfaces of a peg of a NFT. FIG. 4 shows an example of a peg and disc type NFT. The NFT in FIG. 4 includes a peg 405 and a disc 410. The peg 405 shown in FIG. 4 includes five surfaces, an air bearing surface 406, a second surface 407, a third surface 408, a fourth surface 409, and a fifth surface 411. In some embodiments at least the air bearing surface 406 of the peg 405 of the NFT has a metal containing layer deposited thereon. In some embodiments, only the air bearing surface 406 of the peg 405 of the NFT has a metal containing layer deposited thereon. In some embodiments, all five surfaces 406, 407, 408, 409, and 411 of the peg 405 of the NFT having a metal containing layer deposited thereon.

Some disclosed methods can include a next step, step 115, of subjecting at least the metal containing layer to conditions that cause diffusion of at least some of the material of the metal containing layer into at least a portion of the surface of the portion of the NFT structure. This step can include subjecting only the metal containing layer, only a portion of the metal containing layer, at least some portion of the metal containing layer and at least some portion of the portion of the NFT, or any combination thereof to conditions that cause diffusion of the material of the metal containing layer into at least a portion of the surface of the NFT structure. In some embodiments, this step can cause diffusion of more material of the metal containing layer into the portion of the NFT than would otherwise be caused without the step being undertaken.

In some embodiments, step 115 can include annealing at least the metal containing layer. In some embodiments, the NFT structure, the metal containing layer and other portions of the structure containing the same can be annealed. Annealing can be accomplished through oven annealing, laser annealing, vacuum annealing, inductive heating, rapid thermal annealing, or electron beam heating annealing for example.

In some embodiments, oven annealing can be utilized. Oven annealing can be described by an average temperature that at least the metal containing layer is subjected to (e.g., the temperature the oven is set to or the temperature the oven attains), or by the temperature that at least the metal containing layer is raised to. In some embodiments, oven annealing can be described by the average temperature that at least the metal containing layer is subjected to. In such embodiments, oven annealing can include subjecting at least the metal containing layer to a temperature of at least 100° C. In some embodiments, oven annealing can include subjecting at least the metal containing layer to a temperature of at least 150° C. In some embodiments, oven annealing can include subjecting at least the metal containing layer to a temperature of at least 200° C. In some embodiments, oven annealing can include subjecting at least the metal containing layer to a temperature of not more than 250° C. In some embodiments, oven annealing can include subjecting at least the metal containing layer to a temperature of not more than 225° C.

In some embodiments, laser annealing can be utilized. Generally, laser annealing refers to the use of a laser to expose a material to radiation in order to heat the material. In the context of disclosed methods, laser annealing refers to the use of a laser to expose at least the metal containing layer to energy in order to cause at least a portion of the material of the metal containing layer to diffuse into the NFT. In some embodiments, wavelengths, intensity, duty cycles, or some combination thereof can be chosen in order to attain a desired temperature of at least some portion of the metal containing layer. In some embodiments, laser annealing can be configured to heat at least some portion of the metal containing layer to a temperature of at least 100° C. In some embodiments, laser annealing can be configured to heat at least some portion of the metal containing layer to a temperature of at least 150° C. In some embodiments, laser annealing can be configured to heat at least some portion of the metal containing layer to a temperature of at least 200° C. In some embodiments, laser annealing can be configured to heat at least some portion of the metal containing layer to a temperature of not greater than 600° C. In some embodiments, laser annealing can be configured to heat at least some portion of the metal containing layer to a temperature of not greater than 225° C. In some embodiments, the laser anneal step can be carried out using a wavelength of not more than 2000 nm. In some embodiments, the laser anneal step can be carried out using a wavelength of at least 100 nm. In some embodiments, the laser anneal step can be carried out by coupling a laser to the peg through a waveguide in the slider at a power of not less than 30 milliWatts (mW), or not greater than 150 mW for anywhere from a few seconds to a few days, for example.

In some embodiments, step 115 can include applying an electrical bias (for example a negative electrical bias) to the substrate while a metal containing layer is being deposited. In such embodiments, the step 110 and the step 115 are carried out at least somewhat at the same time. Application of an electrical bias can increase the energy of the ions during deposition. The bombardment of energetic ions can thereby cause localized heating, which can cause diffusion of at least some of the material of the metal containing layer into at least a portion of the surface of the NFT. In some embodiments, a negative electrical bias can be at least 200 V. In some embodiments, a negative electrical bias can be at least 10 V. In some embodiments, the electrical bias can be not greater than 1000 V. In some embodiments, the electrical bias can be not greater than 100 killivolts (kV). The bias (e.g., the negative bias) could be a direct current (DC) bias or a pulsed bias.

Disclosed methods can also include an optional step of oxidation (shown in FIG. 1 as step 125) can be utilized to oxidize at least a portion of the metal containing layer. The step of oxidizing, step 125, can be undertaken before the step of causing diffusion of at least a portion of the metal containing layer (step 115), sometime after step 115, or both. In some embodiments where the metal containing layer includes an outer layer, step 125 can be undertaken at least before the diffusion step. In such embodiments, the material of the outer layer can be chosen so that it forms an oxide layer having desirable properties. Exemplary desired properties can include, for example protection of a NFT adjacent layer of a metal containing layer. Exemplary materials that can be chosen for an outer layer that may be oxidized can include, for example materials that may include Si, Ta, Al, Mg, Y, Mn, or Cr.

An optional oxidation step can also be useful when an outer layer of the metal containing layer is chosen as one that will provide a dense oxide layer upon oxidation. In such embodiments, the optional oxidation step is carried out so at least a portion of the outer layer is oxidized.

Commonly utilized oxidation processes, including for example thermal oxidation, plasma oxidation, inductively coupled plasma (ICP) oxidation, remote plasma oxidation, ozone oxidation, and otherwise exposing the materials to an oxidizing environment could be utilized in step 125. In some embodiments, methods that include an outer layer in the metal containing layer and optional step 125 can eliminate the need to remove a cap layer. In some embodiments, the materials surrounding the NFT may also be dielectric materials that have a relatively small coefficient of thermal expansion, a relatively large lattice difference with the material of the NFT (for example gold), or combinations thereof. This could desirably cause high density defects to form at the interface of the NFT and diffusion layer.

Step 140 is another optional step that could be included in disclosed methods. Step 140 includes stressing the metal containing layer. Stressing the metal containing layer could be accomplished using thermal stress, mechanical stress, or some combination thereof. The stressing could also be applied cyclically, for example. Step 140 could be undertaken before step 115 (subjecting the metal containing layer to conditions that cause diffusion), during step 115, or both. Application of stress may improve the metal atom diffusion through the interface of the NFT, and could therefore improve coverage of the NFT peg by the diffusion layer.

Some disclosed methods can also include an optional step, step 145, of removing at least a portion of the metal containing layer before diffusion. It should also be noted that methods that include this step may be considered similar to methods where a metal containing layer is deposited on less than the entire surface of the article on (or in) which the NFT exists. In some embodiments, the metal containing layer can be removed from particular portions of the overall substrate. For example, in some embodiments where a substrate includes, not only a NFT, but also a magnetic reader, it may be advantageous if the metal containing layer is not diffused into the magnetic reader and as such the metal containing layer overlying the magnetic reader can be removed before diffusion.

In some embodiments, step 145 can be accomplished using photolithographic methods. Exemplary photolithographic methods can include, for example deposition of a photoresist to the metal containing layer. The surface can then be exposed to UV light while protecting the regions where the metal containing layer is desired. The regions of the photoresist exposed to UV light can then be removed using solvent or plasma etching. The unprotected (not covered by the remaining photoresist) metal containing layer can then be removed, by for example, plasma etching or chemical etching. The metal containing layer remaining can then be diffused. In some embodiments, a patterning step (for example a photolithographic process) can be used to remove a metal containing layer from the region overlying a magnetic reader, from all surfaces except the peg, from all surfaces except the write pole, or some combination thereof.

Some disclosed methods can also include an optional step, step 120, removing at least a portion of one or more deposited layers. This optional step can function to remove some portion of the metal containing layer material that did not diffuse into the underlying NFT, some portion of an outer layer of the metal containing layer, some oxidized portion of the metal containing layer, or some combination thereof.

In some embodiments, a single layer metal containing layer can be intentionally deposited at a thickness that is in excess of any amount that could diffuse into the NFT and this optional step is designed to remove at least some of that excess material from the surface of the NFT. Removal of the excess metal containing layer can function to prevent reader shunting in a final article made using disclosed methods.

In some embodiments, an optional removal step can function to remove at least a portion of some outer layer of a metal containing layer (either oxidized or un-oxidized). Such a removal step could be designed to decrease the height or thickness of the overall article, removal materials with unwanted properties (e.g., unwanted electrical, mechanical or chemical properties), or some combination thereof.

Removal of at least a portion of a metal containing layer can be accomplished using various methods, which can be chosen at least in part on the identity of the material to be removed. Exemplary processes can include, for example, ion milling, reactive ion etching, plasma etching, or wet etching. In some embodiments, more than one process can be used in a removal step. In some embodiments two (or more) different processes can be used to remove two different layers in a metal containing layer. In some embodiments two (or more) different processes can be used to remove a single layer in a metal containing layer. In embodiments, discussed above for example, that include more than one type of material in the metal containing layer, one (or more) of the materials or layers making up the metal containing layer can be chosen based at least in part on a chosen or desired method (or methods) of removing at least a portion of the metal containing layer.

In some embodiments, the optional step of removing at least a portion of the metal containing layer can leave some portion of the metal containing layer on the NFT. In some embodiments, not more than 0.5 nm of the metal containing layer remains on the surface of the NFT. In some embodiments, not more than 2 nm of the metal containing layer remains on the surface of the NFT.

In some embodiments, a removal step does not remove any portion of the NFT structure originally formed in the method. For example, in some embodiments, a removal step in disclosed methods does not remove any portion of the peg of the NFT.

Exemplary processes and methods that can be utilized in a removal step(s) can include, for example, ion milling, reactive ion etching, plasma etching, wet etching, or some combination thereof could be utilized. A specific exemplary embodiment could include removal of a DLC layer (exemplary outer layer of a metal containing layer) and excess metallic layer (exemplary NFT adjacent layer) by ion milling at glazing incidence or inductively coupled plasma (ICP) reactive ion etching (RIE) to uniformly remove the materials with a high level of control. Also, ICP RIE may allow for selectively removing the NFT adjacent layer material over the underlying metal of the NFT (for example gold).

Some disclosed methods can also include an optional step of depositing a subsequent layer, step 135. Deposition of a subsequent layer can occur at any time, and in some embodiments can occur after some portion of the metal containing layer has been caused to diffuse into the NFT. The subsequent layer can be the same material as some portion of the metal containing layer or a different material. In some embodiments, at least a portion of the metal containing layer will have already been diffused into the NFT and at least some portion of the remaining metal containing layer will have been removed before a subsequent layer is deposited. In such embodiments, the subsequent layer can include, for example a metal. In some embodiments, the subsequent layer can be the same material as one in a NFT adjacent portion of the metal containing layer. It is thought, but not relied upon that a subsequent layer such as this, once oxidized will form a denser oxide than the remaining metal containing layer would have if oxidized. A denser oxide layer may be advantageous in providing higher corrosion resistance.

In some embodiments that include a subsequent layer, the material of the metal containing layer can be chosen for its adhesion properties to the material of the NFT (e.g., the material of the peg, for example gold), its oxidation resistance, and its diffusion rate in the gold lattice (it is desired that the diffusion rate in the gold lattice be low to keep it at the outermost surface of the NFT); and the material of the subsequent layer can be chosen for its ability to form a dense oxide layer upon oxidation. In some embodiments, the subsequent layer can include Si, Ta, Al, Mg, Cr, Y, or combinations thereof.

In some embodiments, the material of layers surrounding the NFT (for example the materials of the core to NFT space (CNS), the pole to NFT space (PNS), or both), and/or materials formed using disclosed methods can be chosen so that those materials have a small coefficient of thermal expansion, large lattice difference with the NFT material, or some combination thereof. These properties can be advantageous because they can cause a higher density of defects to form at the interface of the NFT. The higher density of defects could make it easier for the material of the metal containing layer to diffuse into the NFT (e.g., the intermixed layer) and may thereby contribute to a higher thermal stability of the NFT.

Some disclosed methods can include another optional step, step 130, deposing an overcoat material. Step 130 can be undertaken after a portion of the metal containing layer has been removed or without removal of a portion of the metal containing layer. The overcoat material deposited in this step can include overcoat material and methods of deposition that are typically utilized.

Disclosed methods can include one or more than of the optional steps in FIG. 1. Furthermore, as applicable, some of the steps can be undertaken more than once in a disclosed method; and the order of the steps is not necessarily only as depicted and/or discussed herein.

FIGS. 2A to 2D show an exemplary device at various stages of an exemplary process of making. An exemplary device, shown in FIG. 2A includes a core to NFT space (also referred to CNS) 202, a seed layer 204, a peg 206 of a NFT, a pole to NFT space (also referred to as PNS) 208 and a pole 210. Deposited or located on at least one surface of the peg 206 of the NFT is a metal containing layer 212. The metal containing layer 212 can include materials and be deposited as discussed above. In some embodiments, the metal containing layer 212 can be deposited on the air bearing surface (ABS) of a head that includes a NFT at the stage in process after which it has been lapped. Although not shown in FIG. 2A, the metal containing layer 212 can include an optional outer layer on the surface of the depicted metal containing layer 212. The optional outer layer can include materials and be deposited as discussed above.

Figure 2A:
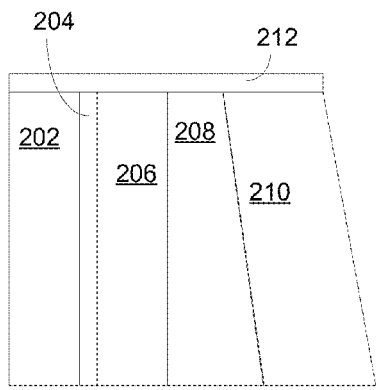
FIGS. 2A through 2D depict cross sections of an article at various stages during exemplary disclosed methods.
Figure 2B:
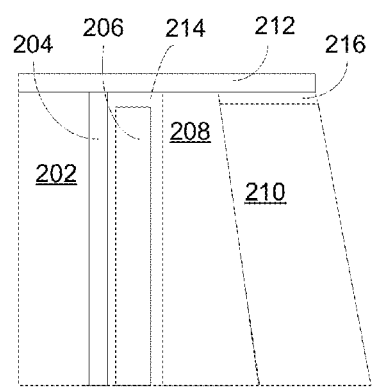

FIG. 2B shows the exemplary device after the metal containing layer has been made to diffuse into the NFT. This can be accomplished using various methods, such as those discussed above. A device at this point includes the CNS 202, seed layer 204, NFT 206, PNS 208, a pole 210 and in some embodiments, at least some of the metal containing layer 212 remains. The device also includes an intermixed layer 214. The intermixed layer 214 is formed when some of the material of the metal containing layer 212 diffuses into the material of the NFT 206. The intermixed layer 214 surrounds at least a portion of the NFT 206, for example the peg of the NFT. In some embodiments, the intermixed layer 214 surrounds five surfaces of the peg. The intermixed layer 214 can generally be described as a layer that was formerly a part of the NFT 206, but due to the step of causing diffusion of the metal containing layer, now contains a mixture of material from the metal containing layer and the NFT material. In some embodiments, the intermixed layer 214 can be described by a thickness. The thickness of the intermixed layer 214 can also be described by how far the atoms of the metal containing layer diffuse into the material of the NFT. In some embodiments, the intermixed layer 214 can have a thickness of not greater than 100 nm. In some embodiments, the intermixed layer 214 can have a thickness of not greater than 10 nm. In some embodiments, the intermixed layer 214 can have thickness of not less than 1 nm. In some embodiments, the intermixed layer 214 can have a thickness of not less than 0.1 nm.

The device in FIG. 2B also shows a pole intermixed layer 216. A pole intermixed layer 216 can be present in situations in which the metal containing layer 212 was deposited over the NFT 206 and the pole 210 and conditions to cause diffusion of the metal containing layer were also applied to the region of the pole 210. The pole intermixed layer 216, if present may be advantageous because it can prevent or minimize oxidation and/or corrosion of the pole.

Figure 2C:
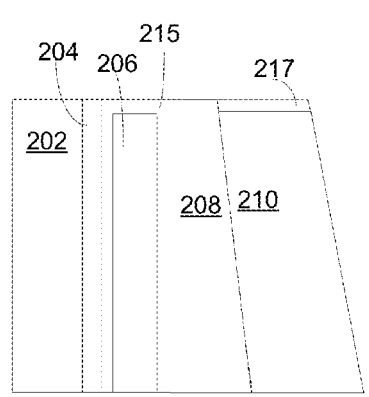

FIG. 2C shows the exemplary device after a removal step. The device shown in FIG. 2C includes the CNS 202, the seed layer 204, the NFT 206, the PNS 208 and the pole 210 as discussed above. The device also includes an intermixed layer 215 and a pole intermixed layer 217. The intermixed layer 215 and the pole intermixed layer 217 depicted at this stage may be the same as the intermixed layer 214 and the pole intermixed layer 216 depicted in FIG. 2B, or they may be different in that some portion thereof could have been removed in the removal step. Removal of the metal containing layer 212 can be accomplished as discussed above, for example using ion milling, reactive ion etching, plasma etching, or wet etching. Removal of the entirety of the metal containing layer 212 can be advantageous because it can prevent electrical shunting of a reader which may also be included in the device (but not depicted). In some embodiments, where an outer layer (such as DLC for example) is included in a metal containing layer, the outer layer and the NFT adjacent layer can be removed, for example with ion milling at glazing incidence or ion conductive plasma (ICP) reactive ion etching (RIE) in order to uniformly remove the DLC and the excess NFT adjacent layer. ICP RIE may also allow for selective removal of the material of the metal containing layer without removal of the underlying material (for example the underlying material of the NFT—for example, gold).

Figure 2D:
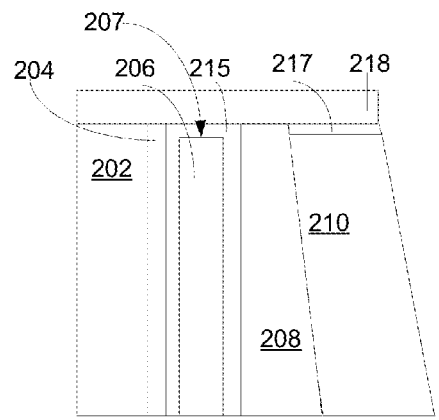

FIG. 2D shows the exemplary device after the next optional step, deposition of an overcoat. The device shown in FIG. 2D includes the CNS 202, the seed layer 204, the NFT 206, the PNS 208, the pole 210, the intermixed layer 215 and the pole intermixed layer 217 as discussed above. The device also includes an overcoat layer 218, which could include, for example a carbon based overcoat.

FIG. 2D shows an exemplary device disclosed herein which includes a NFT 206, an intermixed layer 215 and a pole 210. The intermixed layer 215 can be described as being an outer layer of the NFT 206 into which atoms of a previously deposited metal containing layer have been diffused. The intermixed layer 215 can be present on one or more than one surfaces of the NFT 206. In some embodiments, the intermixed layer 215 can be present on at least the air bearing surface of the NFT 206. As shown in FIG. 2D, the air bearing surface 207 of the NFT 206 is the surface that is adjacent the overcoat layer 218 In some embodiments, the intermixed layer 215 can be present on only the air bearing surface of the NFT 206. In some embodiments, the intermixed layer 215 can be present on five surfaces of the NFT 206 (as depicted in FIG. 4). The intermixed layer 215 can have various thicknesses, for example the intermixed layer can have a thickness of not greater than 30 nm. In some embodiments, the intermixed layer 215 can have a thickness of not greater than 10 nm. In some embodiments, the intermixed layer 215 can have thickness of not less than 1 nm. In some embodiments, the intermixed layer 215 can have a thickness of not less than 0.1 nm.

Exemplary devices can also optionally include an overcoat layer 218, a pole intermixed layer 217, a CNS 204, a PNS 208, or any combination thereof.

Also disclosed herein are embodiments where the material of the metal containing layer diffuses into the NFT in a fashion that forms an intermixed layer having a gradient of metal containing layer material composition. In some embodiments, a portion of the NFT closest to the metal containing layer (or the surface where the metal containing layer was located) can have a higher concentration of the metal containing layer material than a portion of the NFT farther away from the metal containing layer (or the surface where the metal containing layer was located). For example, in some embodiments where the metal containing layer was located on at least the air bearing surface (406 as seen in FIG. 4) of the peg, a portion of the intermixed layer closest to the air bearing surface can have a higher concentration of material from the metal containing layer than a portion of the intermixed layer farther removed from the air bearing surface.

Figure 5:
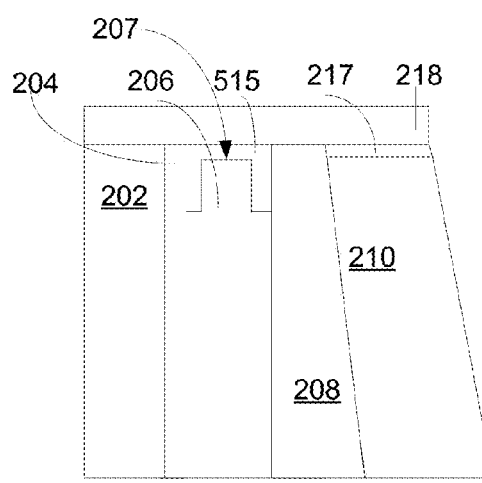
FIG. 5 is a cross section of an exemplary article.

FIG. 5 also shows another exemplary embodiment where the intermixed layer need not be located on all portions of all surfaces. As seen in FIG. 5, the intermixed layer 515 is not present on all sides of the NFT peg (the other components are numbered the same and have the same identity as FIG. 2D). This can be formed by either not forming a metal containing layer on all portions of all surfaces (for example using photolithography processes), or by forming the metal containing layer and either removing portions thereof before diffusion or only diffusing certain portions of it into the NFT.

In some embodiments, the bulk of the peg could include material from the metal containing layer. In some embodiments, only a portion of the bulk of the peg contains material from the metal containing layer. Such a situation may occur when the peg has relatively good adhesion with the surrounding material, thereby causing a low defect level at the interface and preferentially causing the material of the metal containing layer to go to the bulk instead of the interface regions. In some embodiments, the entire bulk of the peg could include material from the metal containing layer. Such a situation may occur when the material of the metal containing layer has a relatively low solubility in the material of the peg.

Figure 3A:
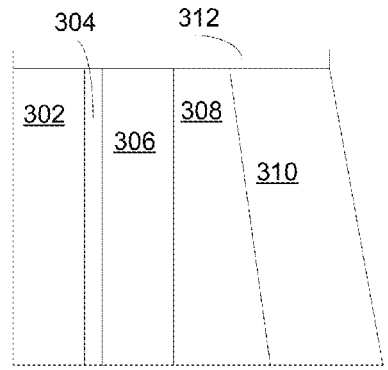
FIGS. 3A through 3E depict cross sections of an article at various stages during exemplary disclosed methods.
Figure 3B:
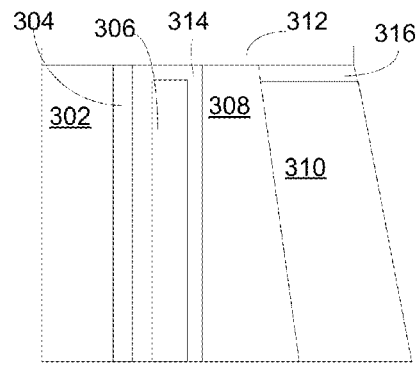

FIGS. 3A to 3E show another exemplary device at various stages of an exemplary process of making. An exemplary device, shown in FIG. 3A includes a CNS 302, a seed layer 304, a peg of a NFT 306, a PNS 308, a pole 310 and a metal containing layer 312. FIG. 3B shows the device after a portion of the metal containing layer has been made to diffuse into the NFT. This can be accomplished using various methods, such as those discussed above. A device at this point includes the CNS 302, seed layer 304, NFT 306, PNS 308, a pole 310 and in some embodiments, at least some of the metal containing layer 312 remains. The device also includes an intermixed layer 314 and an optional pole intermixed layer 316. The device at this point can be similar, or in some embodiments the same as that described with respect to FIG. 2B.

In some embodiments, various process steps can also be added in order to increase the defect density at the NFT/metal containing layer interface. Such process steps can include, for example, thermal stress, mechanical stress, or some combination thereof. Such steps can be undertaken before diffusion of the metal containing layer is caused, during diffusion of the metal containing layer, or some combination thereof. The stress (or stresses) can also be applied in a cyclic fashion. Application of such stresses may improve metal atom diffusion through the interface of the NFT and the metal containing layer and thereby improve the coverage of the NFT (e.g., the peg) with the intermixed layer.

Figure 3C:
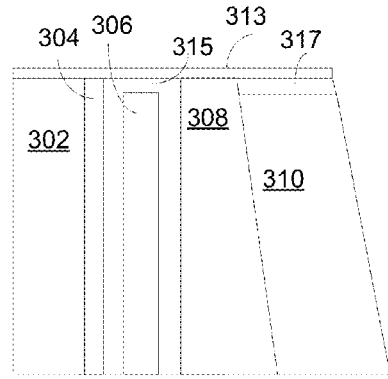

FIG. 3C shows the device after a next step, removal. The embodiment depicted in FIG. 3 C includes the CNS 302, the seed layer 304, the NFT 306, the PNS 308, the pole 310, the intermixed layer 315 and the optional pole intermixed layer 317. The intermixed layer 315 and the pole intermixed layer 317 depicted at this stage may be the same as the intermixed layer 314 and the pole intermixed layer 316 depicted in FIG. 3B, or they may be different in that some portion thereof could have been removed in the removal step. The device also includes some remaining portion of the metal containing layer, referred to herein as residual metal containing layer 313. The residual metal containing layer 313 could be present because the removal process doesn't effectively remove the entire metal containing layer 312 or the removal process could be designed to leave a portion of the metal containing layer so that the metal containing layer could diffuse into the NFT during NFT writing.

Although not depicted in the series of FIGS. 3A to 3E, another optional step can also be added at this stage of the process. In some embodiments, once some of the metal containing layer 312 has been removed (by whatever removal process is chosen), a subsequent layer can be deposited. The subsequent layer can be the same material as the metal containing layer or a different material. In some embodiments, the subsequent layer can be a metal. In some embodiments, the subsequent layer can be the same material as the metal containing layer. It is thought, but not relied upon that the subsequent layer, once oxidized will form a denser oxide than the remaining metal containing layer 313 would have. The denser oxide layer may be advantageous because of a higher corrosion resistance.

In some embodiments that include a subsequent layer, the material of the metal containing layer can be chosen for its adhesion properties to the material of the NFT (e.g., the material of the peg, for example gold), its oxidation resistance, and its diffusion rate in the gold lattice (it is desired that the diffusion rate in the gold lattice be low to keep it at the outermost surface of the NFT); and the material of the subsequent layer can be chosen for its ability to form a dense oxide layer upon oxidation. In some embodiments, the subsequent layer can include Si, Ta, Al, Mg, Cr, Y, Mn, or combinations thereof.

Figure 3D:
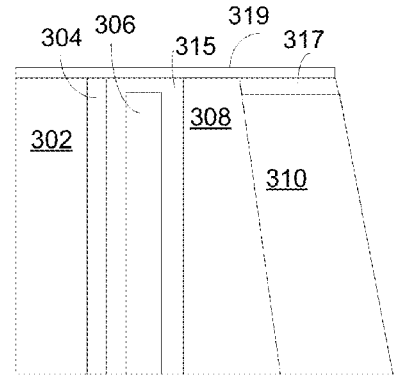

FIG. 3D shows the device after a next step, oxidation. The embodiment depicted in FIG. 3D includes the CNS 302, the seed layer 304, the NFT 306, the PNS 308, the pole 310, the intermixed layer 315, the optional pole intermixed layer 317 and an oxidized layer 319. The oxidized layer 319 can be formed by oxidizing the residual metal containing layer 313. The residual metal containing layer 313 can be oxidized, for example by plasma oxidation processes. Formation of the oxidized layer 319 can function to minimize the likelihood or prevent electrical shunting of the reader. The oxidized layer 319 can have various thicknesses. In some embodiments, the thickness of the oxidized layer 319 can be a function of the thickness of the residual metal containing layer 313. In some embodiments, the oxidized layer 319 can have a thickness of not greater than 10 nm. In some embodiments, the oxidized layer 319 can have a thickness of not greater than 5 nm. In some embodiments, the oxidized layer 319 can have a thickness of not less than 0.1 nm. In some embodiments, the oxidized layer 319 can have a thickness of not less than 0.5 nm. In some circumstances, oxidation of the residual metal containing layer 313 could result in overlying layers that ultimately become too thick over the reader of the device. To alleviate any such problems, the diffusion process could be combined with methods of applying a patterned head overcoat.

Figure 3E:
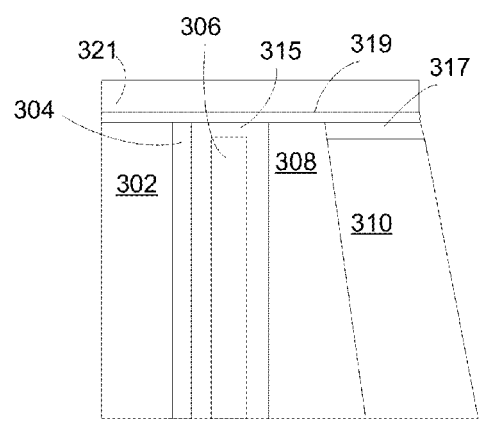

FIG. 3E shows the exemplary device after the next step, deposition of an overcoat. The device shown in FIG. 3E includes the CNS 302, the seed layer 304, the NFT 306, the PNS 308, the pole 310, the intermixed layer 315, the pole intermixed layer 317, and the oxidized layer 319 as discussed above. The device also includes an overcoat layer 321, which could include, for example a carbon based overcoat.

FIG. 3E shows an exemplary device disclosed herein which includes a NFT 306, an intermixed layer 315, an oxidized layer 319 and a pole 310. The intermixed layer 315 can be described as being an outer layer of the NFT 306 into which atoms have been diffused from a previously deposited metal containing layer. The intermixed layer 315 can be present on one or more than one surfaces of the NFT 306. In some embodiments, the intermixed layer 315 can be present on five surfaces of the NFT 306. The oxidized layer 319 can be present on one or more than one surfaces of the intermixed layer 315. Exemplary devices can also optionally include an overcoat layer 321, a pole intermixed layer 317, a CNS 304, a PNS 308, or any combination thereof.

In other optional embodiments (not depicted in the flow of FIGS. 3A to 3E), an optional outer layer can be included in the metal containing layer 312 before diffusion is caused. This optional outer layer can be chosen to serve various purposes. For example, it can prevent or minimize oxidation of the NFT adjacent portion of the metal containing layer during the step that causes diffusion of the metal containing layer. Various materials, including gas barrier layers such as DLC, oxides, nitrides and carbides could serve this purpose. An optional outer layer could also serve as a stop for a removal process. For example, an oxide, such as $SiO_2$ could serve as a stop for a fluorine based (e.g., $CF_4$, $SF_6$, $CHF_3$) etch, as such the etch would remove the $SiO_2$ and stop when it reached the NFT adjacent portion of the metal containing layer.

In embodiments where an optional outer layer is included an etch, for example a plasma etch could be used to remove the outer layer (for example DLC) and part of the NFT adjacent portion of the metal containing layer and leave the intermixed layer intact. Such a process would be repeatable and reliable, and would allow the entire surface of the NFT (e.g., the peg) to be covered with the intermixed layer which could advantageously act as an adhesion layer and increase the thermal stability of the NFT (e.g., the peg). It should be noted that the optional outer layer would likely not be included in a final product that included the use of the outer layer in its manufacture.

The present disclosure is illustrated by the following examples. It is to be understood that the particular examples, assumptions, modeling, and procedures are to be interpreted broadly in accordance with the scope and spirit of the disclosure as set forth herein.

On the ABS surface of a HAMR head (that included a $SiO_2$ CNS, a Au peg of a NFT, and a $SiO_2$ NPS), a variable thickness (given in Table 1 below), variable material (given in Table 1 below) layer was deposited using magnetron sputtering and on top of that surface, a 20 Å layer of diamond like carbon (DLC) film was deposited using cathodic arc to protect the metal layer from oxidation. For the sake of comparison, a 50 Å layer of tantalum oxide (TaO) was also deposited on samples. Sixty (60) examples of each sample were prepared. The examples were thermally annealed at 400° C. for 20 minutes, 1 hour, 3 hours, 6 hours, 12 hours or 48 hours (given in Table 1 below). Critical dimension scanning electron microscopy (CD-SEM) was then used to evaluate whether or not the peg recessed from the ABS surface. Table 1 shows the identities of the samples and their failure rate as a percentage.

TABLE 1

Failure Rate for Various Structures

| | Time of Anneal | | | | | | |
|---|---|---|---|---|---|---|---|
| Layers | 20 mins. | 1 hour | 3 hours | 6 hours | 12 hours | 24 hours | 48 hours |
| 50 Å TaO (98.6% failure when annealing at 300° C. for 3 hours) | 100 | 100 | | | | | |
| 30 Å Al/ 20 Å Cr/ 20 Å DLC | | 87.3 | 86.8 | | | | |
| 25 Å Sn/ 20 Å Cr 20 Å DLC | | | | | 14.29 | 23.64 | 40.74 |
| 20 Å Cr/ 20 Å DLC | | | | 1.9 | 12.7 | 28.3 | 41.8 |
| 25 Å Pt/ 20 Å Cr/ 20 Å DLC | | | 1.8 | 3.5 | 9.0 | 17.6 | 34.0 |
| 30 Å Ni/ 20 Å Cr/ 20 Å DLC | | | 5.6 | 17.0 | 41.5 | 100 | |

Energy-dispersive X-ray (EDX) spectroscopy, which is used to measure the concentration of elements spatially located in an article was used to analyze some of the samples.

Figure 6A:
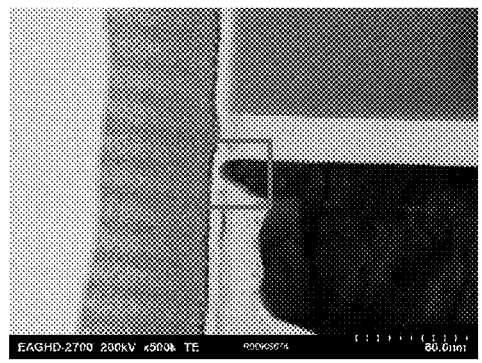
FIG. 6A shows a transmission electron microscope (TEM) image of an exemplary 25 Å Sn/20 Å Cr/20 Å DLC sample.
Figure 6B:
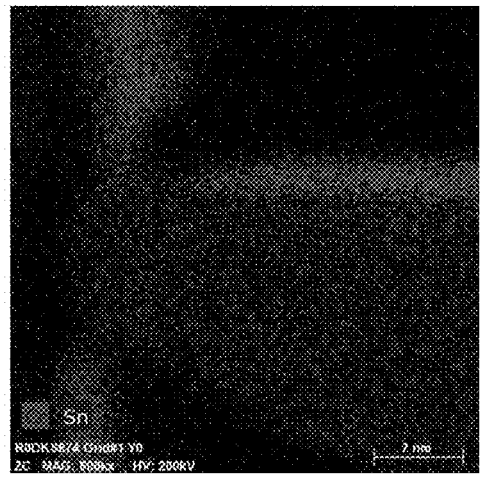
FIG. 6B is an energy-dispersive x-ray (EDX) mapping showing the Cr and Sn concentration at the portion of FIG. 6A shown by the box.
Figure 6C:
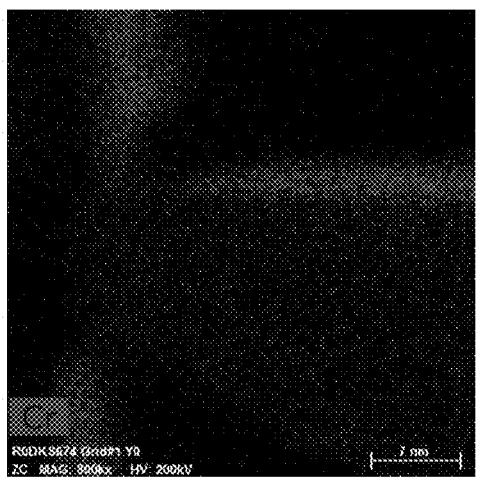
FIG. 6C is a EDX mapping showing the Cr concentration at the portion of FIG. 6A shown by the box.
Figure 6D:
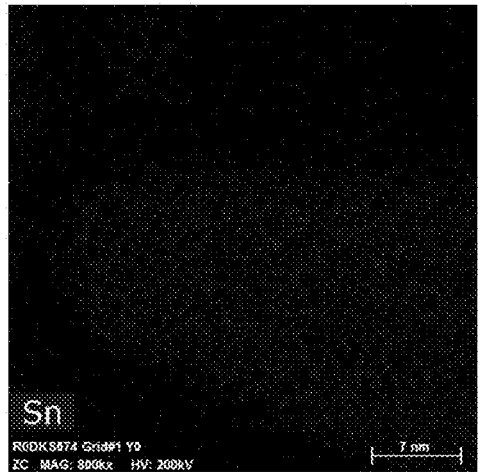
FIG. 6D is a EDX mapping showing the Sn concentration at the portion of FIG. 6A shown by the box.

FIG. 6A shows a transmission electron microscope (TEM) image of one of the 25 Å Sn/20 Å Cr/20 Å DLC samples. FIG. 6B is a EDX mapping showing the Cr and Sn concentration at the portion of FIG. 6A shown by the box, FIG. 6C is a EDX mapping showing the Cr concentration at the portion of FIG. 6A shown by the box, and FIG. 6D is a EDX mapping showing the Sn concentration at the portion of FIG. 6A shown by the box. As seen in the EDX maps, Sn is uniformly distributed in the peg and there is a high concentration of Cr at the interface.

Figure 7A:
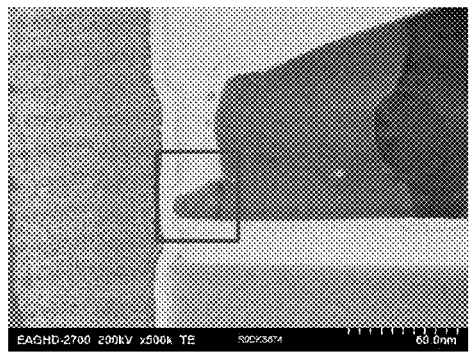
FIG. 7A shows a TEM image of an exemplary 25 Å 25 Å Pt/20 Å Cr/20 Å sample.
Figure 7B:
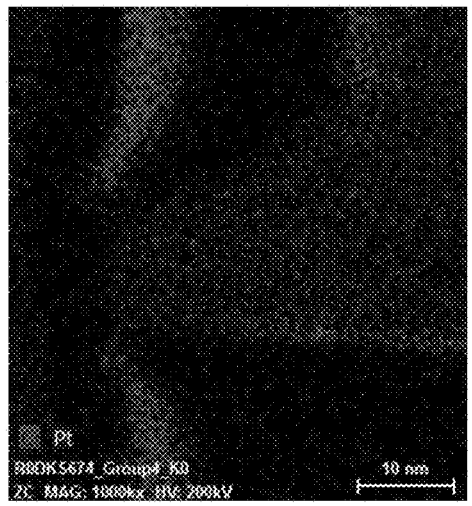
FIG. 7B is an EDX mapping showing the Cr and Sn concentration at the portion of FIG. 7A shown by the box.
Figure 7D:
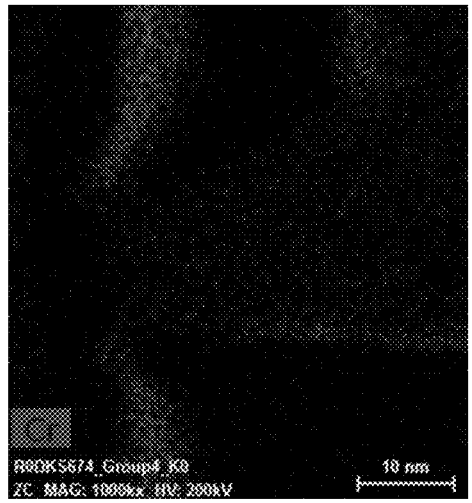
FIG. 7D is a EDX mapping showing the Sn concentration at the portion of FIG. 7A shown by the box.
Figure 7D:
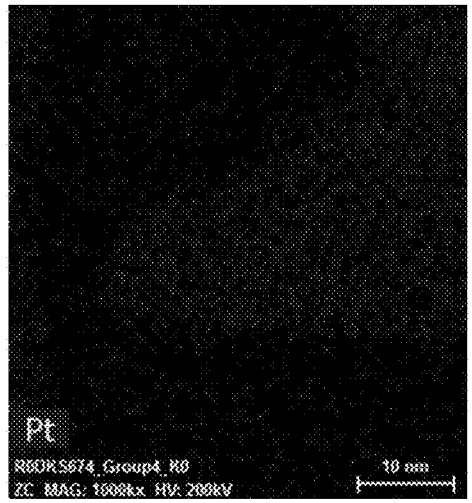

FIG. 7A shows a SEM image of one of the 25 Å Pt/20 Å Cr/20 Å DLC samples. FIG. 7B is a EDX mapping showing the Cr and Pt concentration at the portion of FIG. 7A shown by the box, FIG. 7C is a EDX mapping showing the Cr concentration at the portion of FIG. 7A shown by the box, and FIG. 7D is a EDX mapping showing the Pt concentration at the portion of FIG. 7A shown by the box. As seen in the EDX maps, Pt is uniformly distributed in the peg and there is a low concentration of Cr in the peg, but a relatively high concentration at the interface.

Figure 8A:
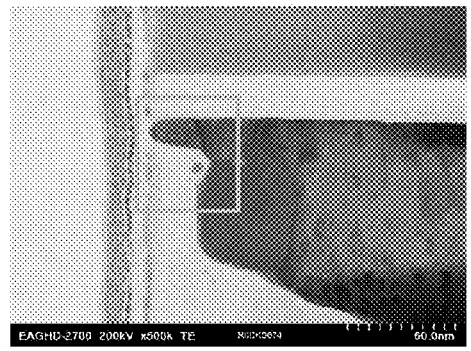
FIG. 8A shows a TEM image of an exemplary 25 Å 30 Å Ni/20 Å Cr/20 Å DLC sample.
Figure 8B:
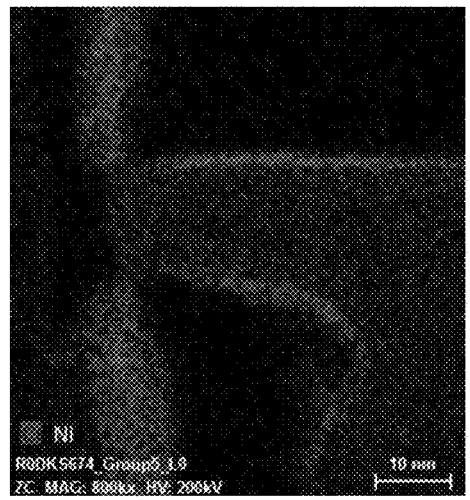
FIG. 8B is an EDX mapping showing the Cr and Sn concentration at the portion of FIG. 8A shown by the box.
Figure 8C:
FIG. 8C is a EDX mapping showing the Cr concentration at the portion of FIG. 8A shown by the box.
Figure 8D:
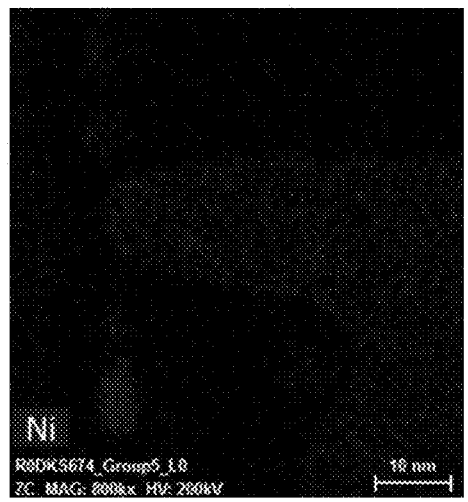
FIG. 8D is a EDX mapping showing the Sn concentration at the portion of FIG. 8A shown by the box.

FIG. 8A shows a SEM image of one of the 30 Å Ni/20 Å Cr/20 Å DLC samples. FIG. 8B is a EDX mapping showing the Ni and Cr concentration at the portion of FIG. 8A shown by the box, FIG. 8C is a EDX mapping showing the Cr concentration at the portion of FIG. 8A shown by the box, and FIG. 8D is a EDX mapping showing the Ni concentration at the portion of FIG. 8A shown by the box. As seen in the EDX maps, Ni is uniformly distributed in the peg and there is a low concentration of Cr in the peg, but a relatively high concentration at the interface.

One skilled in the art will appreciate that the articles, devices and methods described herein can be practiced with embodiments other than those disclosed. The disclosed embodiments are presented for purposes of illustration and not limitation. One will also understand that components of the articles, devices and methods depicted and described with regard to the figures and embodiments herein may be interchangeable.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of" as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of methods of forming portions of near field transducers (NFTs) and articles formed thereby are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. A method comprising:
   forming at least a portion of a near field transducer (NFT) structure;
   depositing a material onto at least one surface of the portion of the NFT structure to form a metal containing layer;
   subjecting the metal containing layer to conditions that cause diffusion of at least a portion of the material into the at least one surface of the portion of the NFT structure.

2. The method according to claim 1, wherein the step of subjecting the metal containing layer to conditions that cause diffusion comprises annealing.

3. The method according to claim 2, wherein the annealing comprises oven annealing or laser annealing.

4. The method according to claim 2, wherein the annealing comprises heating the metal containing layer to at least about 100° C.

5. The method according to claim 1, wherein the step of subjecting the metal containing layer to conditions that cause diffusion comprises applying an electrical bias to the NFT structure and wherein the step of depositing and applying the electrical bias to the NFT structure are undertaken simultaneously.

6. The method according to claim 5, wherein the electrical bias is from about 200 V to about 1000 V.

7. The method according to claim 1, wherein the metal containing layer comprises Cr, Sn, Pt, Y, Pd, Mn, Cu, In, Ni, Pd, Al, Ti, Ta, or combinations thereof.

8. The method according to claim 1, wherein the metal containing layer comprises at least two layers.

9. The method according to claim 8, wherein the metal containing includes an outer layer comprising Si, Ta, Al, Mn, Y, Cr, or combinations thereof.

10. The method according to claim 9 further comprising oxidizing at least a portion of the outer layer.

11. The method according to claim 1 further comprising removing some portion of the metal containing layer from the at least one surface of the portion of the NFT structure.

12. The method according to claim 11, wherein the step of removing some portion of the metal containing layer is accomplished with plasma etching, or ion milling.

13. The method according to claim 12, wherein not more than about 0.5 nanometers of the metal containing layer remains on the surface of the NFT structure.

14. The method according to claim 1 further comprising depositing an overcoat material after some portion of the metal containing layer has been removed.

15. The method according to claim 1 further comprising removing a portion of the metal containing layer before subjecting it to conditions to cause it to diffuse.

16. A method comprising:
forming at least a portion of a near field transducer (NFT) structure;
depositing a material onto at least an air bearing surface of the NFT structure to form a metal containing layer;
subjecting the metal containing layer to conditions that cause diffusion of at least a portion of the material into the at least one surface of the portion of the NFT structure;
removing at least a portion of the metal containing layer; and
applying an overcoat layer.

17. The method according to claim 16 further comprising oxidizing at least a portion of the metal containing layer after subjecting it to diffusion causing conditions.

18. A method comprising:
forming at least a portion of a near field transducer (NFT) structure;
depositing a material onto at least an air bearing surface of the NFT structure to form a metal containing layer;
removing a portion of the metal containing layer not on the air bearing surface of the NFT structure;
subjecting the metal containing layer to conditions that cause diffusion of at least a portion of the material into the at least one surface of the portion of the NFT structure;
removing at least a portion of the metal containing layer; and
applying an overcoat layer.

19. The method according to claim 18 further comprising oxidizing at least a portion of the metal containing layer after subjecting it to diffusion causing conditions.

20. The method according to claim 18 wherein the step of subjecting the metal containing layer to conditions that cause diffusion comprises annealing.

* * * * *